United States Patent
Sime et al.

(10) Patent No.: US 10,381,046 B2
(45) Date of Patent: Aug. 13, 2019

(54) APPARATUS AND METHODS FOR RECORDING AUDIO AND VIDEO

(71) Applicants: David A. Sime, Park City, UT (US); William Jon Igo, Salt Lake City, UT (US); Robert Walter Ingraham, Farmington, UT (US); Jonathon Eldon Hair, West Bountiful, UT (US); Brenda Lee Dowler, Bountiful, UT (US); Gregory Kirk Williams, Wellsville, UT (US)

(72) Inventors: David A. Sime, Park City, UT (US); William Jon Igo, Salt Lake City, UT (US); Robert Walter Ingraham, Farmington, UT (US); Jonathon Eldon Hair, West Bountiful, UT (US); Brenda Lee Dowler, Bountiful, UT (US); Gregory Kirk Williams, Wellsville, UT (US)

(73) Assignee: United States Bankruptcy Court for the District of Utah, Salt Lake City, UT (US)

( * ) Notice: Subject to any disclaimer, the term of this patent is extended or adjusted under 35 U.S.C. 154(b) by 0 days.

(21) Appl. No.: 14/800,488

(22) Filed: Jul. 15, 2015

(65) Prior Publication Data
US 2016/0019933 A1 Jan. 21, 2016

Related U.S. Application Data

(60) Provisional application No. 62/025,241, filed on Jul. 16, 2014.

(51) Int. Cl.
*G11B 27/28* (2006.01)
*H04N 9/82* (2006.01)
(Continued)

(52) U.S. Cl.
CPC ............. *G11B 27/28* (2013.01); *G06Q 10/10* (2013.01); *G06Q 50/18* (2013.01); *G11B 27/34* (2013.01);
(Continued)

(58) Field of Classification Search
USPC .................................................. 386/239–248
See application file for complete search history.

(56) References Cited

U.S. PATENT DOCUMENTS 4,829,578 A 5/1989 Roberts
4,924,387 A 5/1990 Jeppesen
(Continued)

*Primary Examiner* — Hung Q Dang
(74) *Attorney, Agent, or Firm* — Madson IP

(57) ABSTRACT

Audio/video recorders are presented for recording audio and video of various types of proceedings, including court proceedings. In some examples, audio/video recorders may obtain case information associated with a case identifier from a case management database, and associate at least some of the case information with one or more audio channel inputs of the audio interface. In some examples, audio/video recorders may associate a speaker with an audio channel input of the audio interface, determine that an amplitude of an audio signal received at the audio channel input is above a threshold, determine a time when the amplitude of the audio signal at the audio channel was determined to be above the threshold, and generate metadata as a timeline indicating that the first speaker began speaking at the first time.

22 Claims, 8 Drawing Sheets

(51) Int. Cl.
*H04N 5/77* (2006.01)
*G06Q 50/18* (2012.01)
*G06Q 10/10* (2012.01)
*G11B 27/34* (2006.01)

(52) U.S. Cl.
CPC ............. *H04N 5/77* (2013.01); *H04N 9/8205* (2013.01); *H04N 9/8211* (2013.01)

(56) References Cited

U.S. PATENT DOCUMENTS

| | | | |
|---|---|---|---|
| 5,280,430 A | 1/1994 | Woods et al. | |
| 5,369,704 A | 11/1994 | Bennett et al. | |
| 5,426,510 A | 6/1995 | Meredith | |
| 5,559,875 A * | 9/1996 | Bieselin | H04M 3/56 379/202.01 |
| 5,710,591 A * | 1/1998 | Bruno | H04M 3/42221 348/14.06 |
| 5,740,245 A | 4/1998 | Bennett et al. | |
| 5,884,256 A | 3/1999 | Bennett et al. | |
| 6,188,831 B1 * | 2/2001 | Ichimura | H04N 5/9261 360/72.1 |
| 6,262,724 B1 | 7/2001 | Crow et al. | |
| 6,332,147 B1 | 12/2001 | Moran et al. | |
| 6,389,434 B1 | 5/2002 | Rivette | |
| 6,694,315 B1 * | 2/2004 | Grow | G06F 17/30011 |
| 6,871,107 B1 | 3/2005 | Townsend et al. | |
| 7,212,873 B1 | 5/2007 | Townsend et al. | |
| 7,617,445 B1 | 11/2009 | Townsend et al. | |
| 7,679,637 B1 * | 3/2010 | Kohler | H04L 12/1827 348/14.01 |
| 7,974,715 B2 | 7/2011 | Townsend et al. | |
| 2002/0133513 A1 | 9/2002 | Townsend et al. | |
| 2005/0024484 A1 * | 2/2005 | Leonard | H04N 7/15 348/14.01 |
| 2010/0100572 A1 | 4/2010 | Schiller | |
| 2010/0100805 A1 | 4/2010 | Williams et al. | |
| 2010/0158204 A1 * | 6/2010 | Diskin | H04M 3/42221 379/85 |
| 2010/0220844 A1 * | 9/2010 | Noldus | H04M 3/567 379/202.01 |
| 2012/0072374 A1 | 3/2012 | Williams et al. | |
| 2013/0024196 A1 * | 1/2013 | Ganong, III | G10L 17/00 704/246 |
| 2013/0216206 A1 * | 8/2013 | Dubin | H04N 7/155 386/282 |
| 2013/0335511 A1 * | 12/2013 | Maeda | H04N 7/15 348/14.08 |
| 2016/0134668 A1 * | 5/2016 | Shetty | H04L 65/403 370/260 |

* cited by examiner

APPARATUS AND METHODS FOR RECORDING AUDIO AND VIDEO

CLAIM OF PRIORITY UNDER 35 U.S.C. § 119

The present application for patent claims priority to Provisional Application No. 62/025,241 entitled "Judicial Voice Recorder System" filed Jul. 16, 2014, the entire disclosure of which is hereby expressly incorporated by this reference.

TECHNICAL FIELD

The present disclosure relates generally to audio and video recording. More specifically, various implementations of the present disclosure relate to methods, devices and systems for recording audio and video of a judicial, administrative, or other proceeding.

BACKGROUND

The federal District and Bankruptcy courts are statutorily mandated to capture an accurate record of court proceedings pursuant to 28 U.S.C. § 753 and 28 U.S.C. § 773. Additionally, appellate courts, state courts, administrative agencies, and many municipal courts and organizations record proceedings to maintain a record of proceedings. Accuracy of the record for speakers, case information and proceeding notes vary. Traditional methods for recording proceedings are labor intensive and accuracy varies. General recording systems available in today's market require manual processes to track the speakers and rely heavily on operator input for the accuracy of the record. Further, such recording systems do not integrate with case management or calendaring programs and have limited user interface capabilities for optimizing the recording accuracy and quality.

BRIEF SUMMARY

Various embodiments of the present disclosure include devices and methods for recording audio and video of different kinds of proceedings. In one or more embodiments, an audio/video recorder includes an audio interface with a plurality of audio channel inputs, a storage medium, and a display. The audio interface, storage medium and display may be coupled to a processing circuit. The processing circuit may include logic to obtain from a case management database case information associated with a case identifier. The processing circuit may further include logic to associate at least some of the case information with one or more audio channel inputs of the audio interface. Audio signals may be received at one or more audio channel inputs of the audio interface, and the processing circuit may include logic to store in the storage medium the received audio signals and the associated case information as at least a portion of a case record.

In one or more additional embodiments, an audio/video recorder may include an audio interface with a plurality of audio channel inputs, a storage medium, and a display. A processing circuit may be coupled to the audio interface, the storage medium and the display, and may include logic to associate a first speaker with a first audio channel input of the audio interface, determine that an amplitude of a first audio signal received at the first audio channel input is above a threshold, and determine a first time when the amplitude of the first audio signal at the first audio channel was determined to be above the threshold. The processing circuit may further include logic to generate first metadata as a timeline indicating that the first speaker began speaking at the first time, and to store the first audio signal in the storage medium as a first audio track together with the first metadata associated with the first audio track.

Additional embodiment of the present disclosure relate to methods operational on an audio/video recorder. One or more implementations of such methods may include obtaining a case identifier. Case information associated with the case identifier may be obtained from a case management database. At least some of the case information may be associated with one or more audio channel inputs of the audio interface. Audio signals may be received at the one or more audio channel inputs of the audio interface, and the received audio signals may be stored together with the associated case information as at least a portion of a case record.

One or more additional implementations of such methods may include associating a first speaker with a first audio channel input of an audio interface. A determination may be made that an amplitude of a first audio signal received at the first audio channel input is above a threshold. A determination may also be made about when the amplitude of the first audio signal at the first audio channel was determined to be above the threshold. First metadata may be generated as a timeline indicating that the first speaker began speaking at the first time, and the first audio signal may be stored as a first audio track together with the first metadata associated with the first audio track.

Further embodiments of the present disclosure include processor-readable storage mediums storing processor-executable programming operational on a processor. In at least one embodiment, the processor-executable programming may be adapted to cause a processing circuit to obtain a case identifier, obtain case information associated with the case identifier from a case management database, associate at least some of the case information with one or more audio channel inputs of the audio interface, receive audio signals at the one or more audio channel inputs of the audio interface, and store in the storage medium the received audio signals and the associated case information as at least a portion of a case record.

In at least one additional embodiment, the processor-executable programming may be adapted to cause a processing circuit to associate a first speaker with a first audio channel input of the audio interface, determine that an amplitude of a first audio signal received at the first audio channel input is above a threshold, determine a first time when the amplitude of the first audio signal at the first audio channel was determined to be above the threshold, generate first metadata as a timeline indicating that the first speaker began speaking at the first time, and store the first audio signal in the storage medium as a first audio track together with the first metadata associated with the first audio track.

BRIEF DESCRIPTION OF THE SEVERAL VIEWS OF THE DRAWINGS

Exemplary embodiments of the disclosure will become more fully apparent from the following description and appended claims, taken in conjunction with the accompanying drawings. Understanding that these drawings depict only exemplary embodiments and are, therefore, not to be considered limiting of the disclosure's scope, the exemplary embodiments of the disclosure will be described with additional specificity and detail through use of the accompanying drawings in which:

REFERENCE NUMBERS

Figure 1:
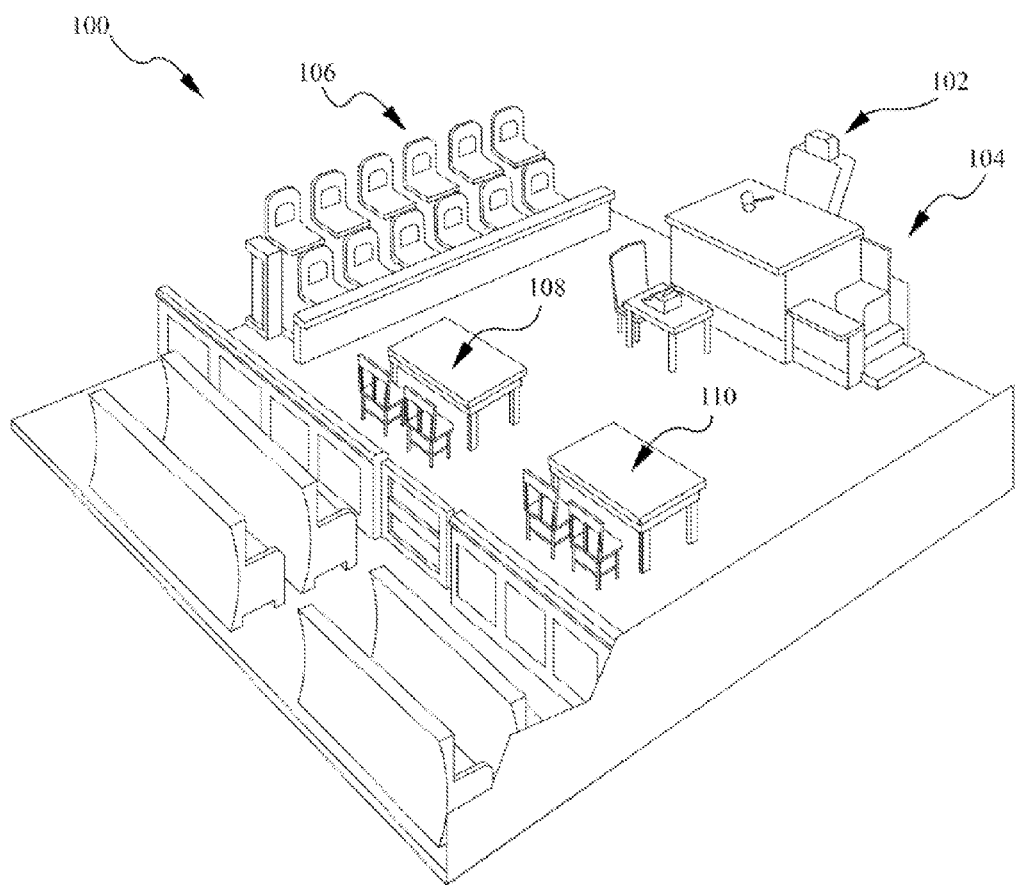
FIG. 1 is a diagram illustrating an example of an environment in which one or more embodiments of the present disclosure may be employed.

| | |
|---|---|
| courtroom 100 | judicial bench 102 |
| witness box or stand 104 | Jury box 16 |
| plaintiff/prosecution counsel table 108 | defense counsel table 110 |
| voice recording system 200 | microphone 202 |
| microphone 204 | microphone 206 |
| microphone 208 | microphone 210 |
| audio/video recorder 212 | audio/video recorder 300 |
| processing circuit 302 | audio and/or video interface 304 |
| user interface 306 | storage medium 308 |
| case management integration circuit 310 | speaker tracking circuit 312 |
| venue mapping circuit 313 | audio channel input(s) 314 |
| case management integration operations 316 | speaker tracking operations 318 |
| venue mapping operations 320 | table 402 |
| stand 404 | lectern 406 |
| television 408 | telephone 410 |
| method 700 | display generic venue space box 702 |
| identify audio sources box 704 | associate audio source box 706 |
| method 800 | obtain case identifier box 802 |
| obtain case information box 804 | associate case information box 806 |
| receive audio signals box 808 | store received signals box 810 |
| method 900 | associate first speaker 902 |
| determine amplitude of audio signal box 904 | determine time box 906 |
| generate metadata timeline box 908 | store audio signal with metadata 910 |

DETAILED DESCRIPTION

Various exemplary embodiments of the present disclosure relate to devices, systems and methods for accurately recording court proceedings as well as other administrative meetings and proceedings.

The word "exemplary" is used exclusively herein to mean "serving as an example, instance, or illustration." Any embodiment described herein as "exemplary" is not necessarily to be construed as preferred or advantageous over other embodiments.

FIG. 1 is a diagram illustrating an example of an environment in which one or more embodiments of the present disclosure may be employed. Various embodiments of the present disclosure may find utility, for example, in a courtroom 100. A courtroom 100 may include a judicial bench 102 where a judge or magistrate may sit during proceedings, a witness box or stand 104, a jury box 106, a plaintiff counsel or prosecution counsel table 108, and a defense counsel table 110. Additional features of a courtroom 100 may also be included, such as a lectern, a clerk's desk, etc.; however, such additional features are not shown so not to obscure or to add complexity to the description. Armed with the description provided, those skilled in the art will know how to implement additional features without undue experimentation.

Figure 2:
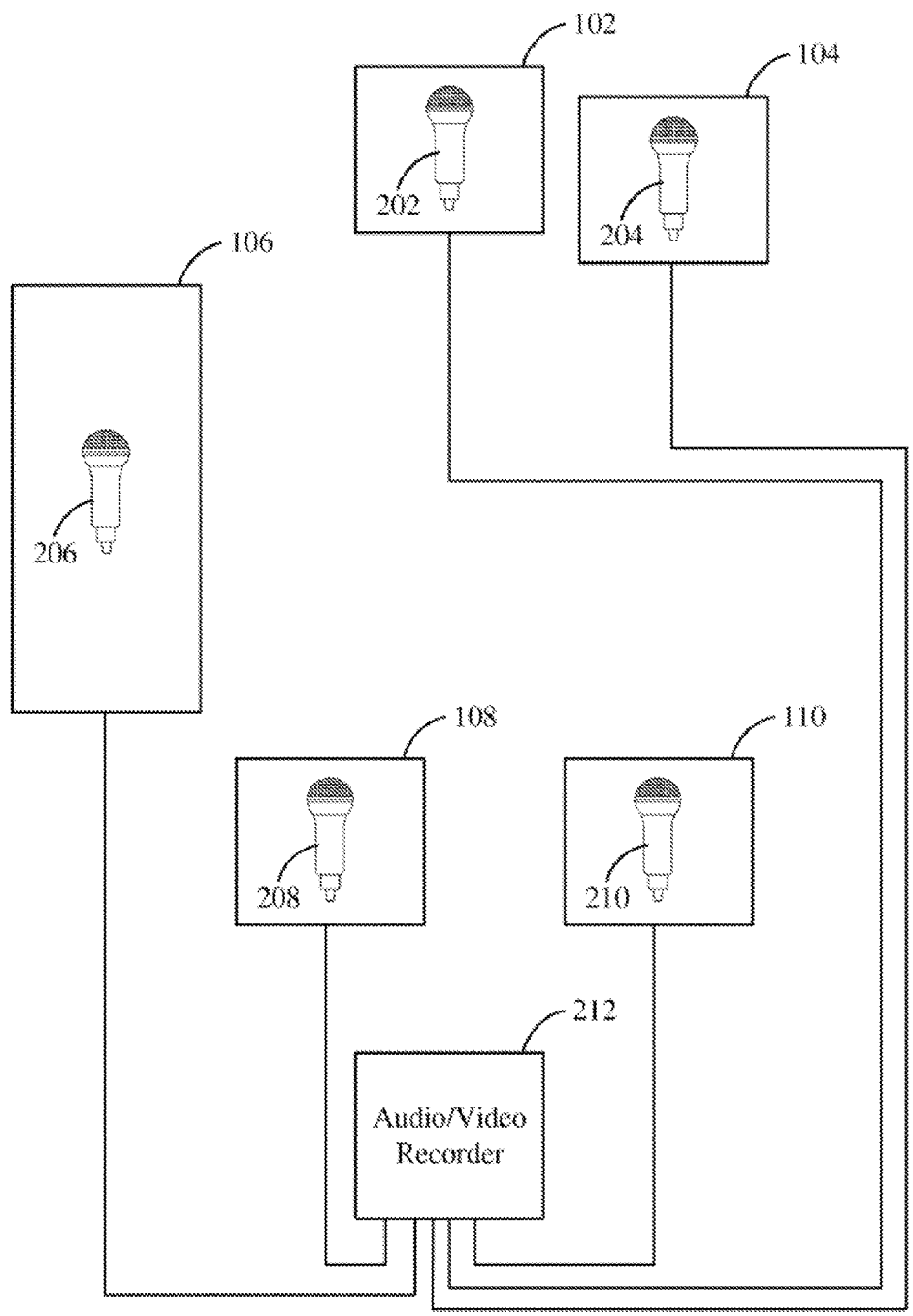
FIG. 2 illustrates a block diagram of a voice recording system implemented in the environment of FIG. 1.

According to aspects of the present disclosure, one or more microphones may be included at each location to capture audio from one or more speakers at each location in the courtroom 100. FIG. 2 illustrates a block diagram of an exemplary voice recording system 200 implemented in the courtroom 100 of FIG. 1. As depicted, microphones 202, 204, 206, 208, and 210 are respectively located at the judicial bench 102, the witness box 104, the jury box 106, the plaintiff/prosecution counsel table 108, and the defense counsel table 110. In addition to microphones, one or more respective video cameras (not shown) may also be positioned to obtain video images of a person speaking at one or more of the microphones. Each of the microphones 202, 204, 206, 208, and 210, as well as any video cameras (not shown) can be coupled with an audio/video recorder 212 configured to record audio and/or video when a person at any particular microphone is speaking. In some examples, other audio sources may also be employed, such as an audio player and/or teleconferencing audio only or audio/video source.

The audio/video recorder 212 may be a data processing system adapted to use processor readable data and to digitize audio and/or video inputs and store the digitized data in a storage medium. By way of example and not limitation, the audio/video recorder 212 may comprise a desktop computer, a laptop computer, a notebook computer, a tablet computer, or a smart phone, with a mixer or sound card included in or connected to such devices. The audio/video recorder 212 can record voice input from any audio source (e.g., microphones 202, 204, 206, 208, and 210) coupled to an input of the audio/video recorder 212 as an independent audio track. In this way, each individual audio track can be isolated in situations where persons at two different microphones may be talking at the same time. As will be described in more detail below, the audio/video recorder 212 can obtain audio recordings of proceedings together with additional information.

Figure 3:
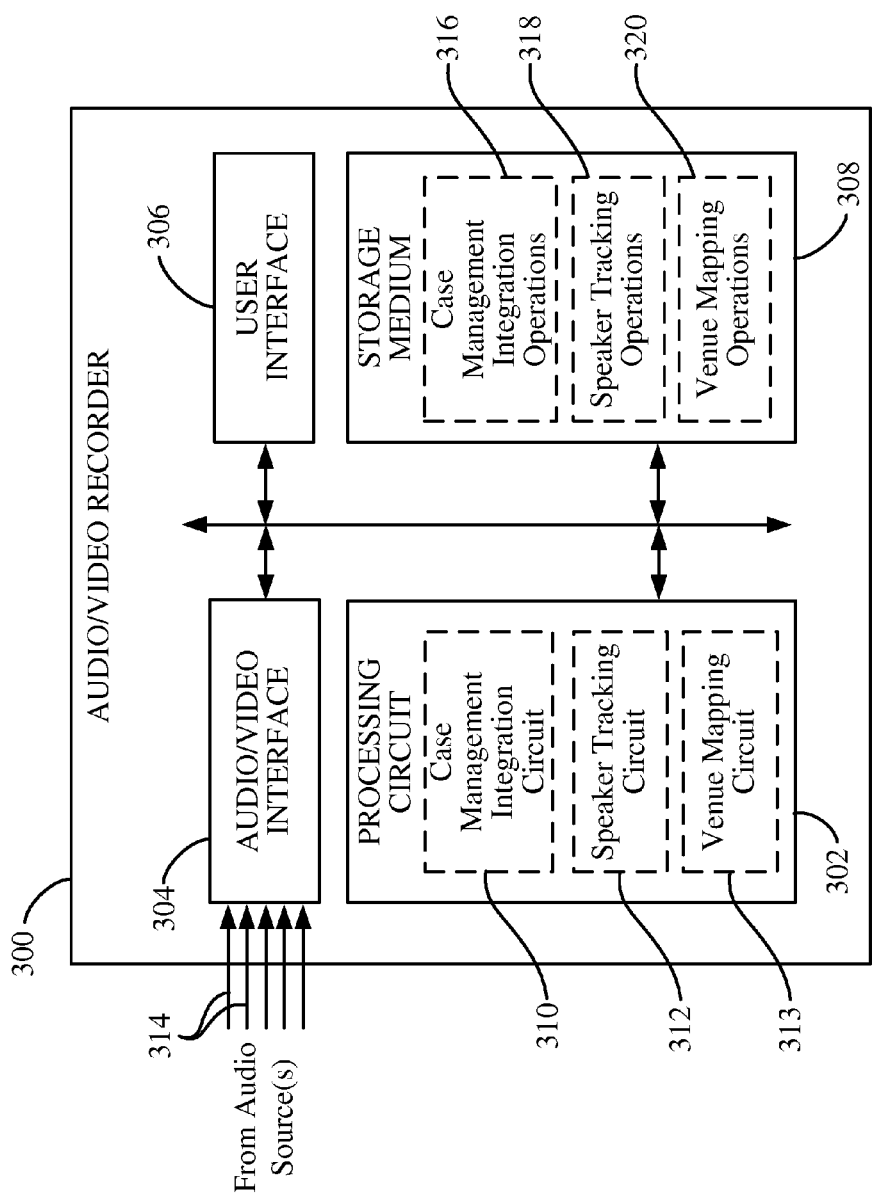
FIG. 3 is a block diagram of an audio/video recorder according to at least one example of the present disclosure.

Turning to FIG. 3, a block diagram of an exemplary audio/video recorder 300 is shown according to at least one example of the present disclosure. The audio/video recorder 300 may generally include a processing circuit 302 coupled to or placed in electrical communication noted that additional, fewer and/or different features and components may be included in the audio/video recorder 300 according to various examples of the present disclosure.

The processing circuit 302 is arranged to obtain, process and/or send data, control data access and storage, issue commands, and control other desired operations. The processing circuit 302 may include circuitry adapted to implement desired programming provided by appropriate media, and/or circuitry adapted to perform one or more functions described in this disclosure. For example, the processing circuit 302 may be implemented as one or more processors, one or more controllers, and/or other structure configured to execute executable programming and/or execute specific functions. Examples of the processing circuit 302 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. These features of the general purpose processor are well known known to these skilled in the art and are not specifically shown in FIG. 3 so not to obscure, confuse, or add complexity unnecessarily. The processing circuit 302 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 302 are for illustration and other suitable configurations within the scope of the present disclosure are also contemplated.

The processing circuit 302 may include circuitry adapted for processing, including the execution of programming, which may be stored on the storage medium 308. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 302 may include a case management integration circuit 310, a speaker tracking circuit 312, and a venue mapping circuit 313. The case management integration circuit 310 may include circuitry and/or programming (e.g., programming stored on the storage medium 308) adapted to obtain case information for use in managing audio and/or video recordings of proceedings, as will be described more thoroughly below. The speaker tracking circuit/module 312 may include circuitry and/or programming (e.g., programming stored on the storage medium 308) adapted to track the source of received audio and associate an identification (e.g., a name) of the speaker at a given time during a proceeding. As used herein, reference to circuitry and/or programming may be generally referred to as logic (e.g., logic gates and/or data structure logic).

The audio and/or video interface 304 (referred to hereinafter as "audio/video interface 304") is configured to obtain audio and/or video signals from one or more audio and/or video sources. The audio and/or video signals may be digitized prior to arriving at the audio/video interface 304 in some embodiments. In other embodiment, the audio and/or video signals may be digitized by the audio/video interface 304. That is, the audio/video interface 304 may receive analogue signals, and may digitize the analogue according to well-known analog to digital conversion techniques. The digitized audio may also be encoded using one or more conventional codecs. The audio/video interface 304 includes multiple audio channel inputs 314 to enable each microphone and/or video camera to be input as its own track. In this manner, each audio channel input 314 can be obtained as an independent track for multi-track recordings. In some examples, the audio/video interface 304 may be implemented as an external mixer. In other examples, the audio-video interface 304 may be implemented as a sound and/or video card with multiple channel inputs.

The user interface 306 is configured to facilitate user interaction with the data processing system 300, and may include a display, a keyboard, a mouse, a touch screen, a microphone, and/or a speaker, etc. A display may be adapted to visually present images to a user, including a venue template that can be employed to map detected microphones within a venue. For example, the user interface 306 may include a display such as a monitor, television, projector, or other device for visually presenting graphics to a user.

The storage medium 308 may represent one or more processor-readable devices for storing programming, such as processor executable code or instructions (e.g., software, firmware), electronic data, databases, or other digital information. The storage medium 308 may also be used for storing data that is manipulated by the processing circuit 302 when executing programming. The storage medium 308 may be any available media that can be accessed by a general purpose or special purpose processor, including portable or fixed storage devices, optical storage devices, and various other mediums capable of storing, containing and/or carrying programming. By way of example and not limitation, the storage medium 308 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 308 may be coupled to the processing circuit 302 such that the processing circuit 302 can read information from, and write information to, the storage medium 308. That is, the storage medium 308 can be coupled to the processing circuit 302 so that the storage medium 308 is at least accessible by the processing circuit 302, including examples where the storage medium 308 is integral to the processing circuit 302 and/or examples where the storage medium 308 is separate from the processing circuit 302 (e.g., resident in the audio/video recorder 300, external to the audio/video recorder 300, distributed across multiple entities).

Programming stored by the storage medium 308, when executed by the processing circuit 302, causes the processing circuit 302 to perform one or more of the various functions and/or process steps described herein. In at least some examples, the storage medium 308 may include case management integration operations 316, speaker tracking operations 318, and/or venue mapping operations 320. The case management integration operations 316 can cause the processing circuit 302 to obtain case-specific data from a case management or other calendar system for use as metadata associated with an audio and/or video recording of the proceedings, as described herein. The speaker tracking operations 318 can cause the processing circuit 302 to track the identification (e.g., name) of and/or location of different speakers throughout the course of a proceeding, as described herein. The venue mapping operations 320 can cause the processing circuit 302 to obtain user inputs via the user interface 306 to select relative positions for each microphone in a particular venue, as described herein.

Thus, according to one or more aspects of the present disclosure, the processing circuit 302 is adapted to perform (independently or in conjunction with the storage medium 308) any or all of the processes, functions, steps and/or routines for any or all of the audio/video recorders described herein (e.g., audio/video recorder 212, audio/video recorder 300). As used herein, the term "adapted" in relation to the processing circuit 302 may refer to the processing circuit 302 being one or more of configured, employed, implemented, and/or programmed (in conjunction with the storage medium 308) to perform a particular process, function, step and/or routine according to various features described herein.

Figure 4:
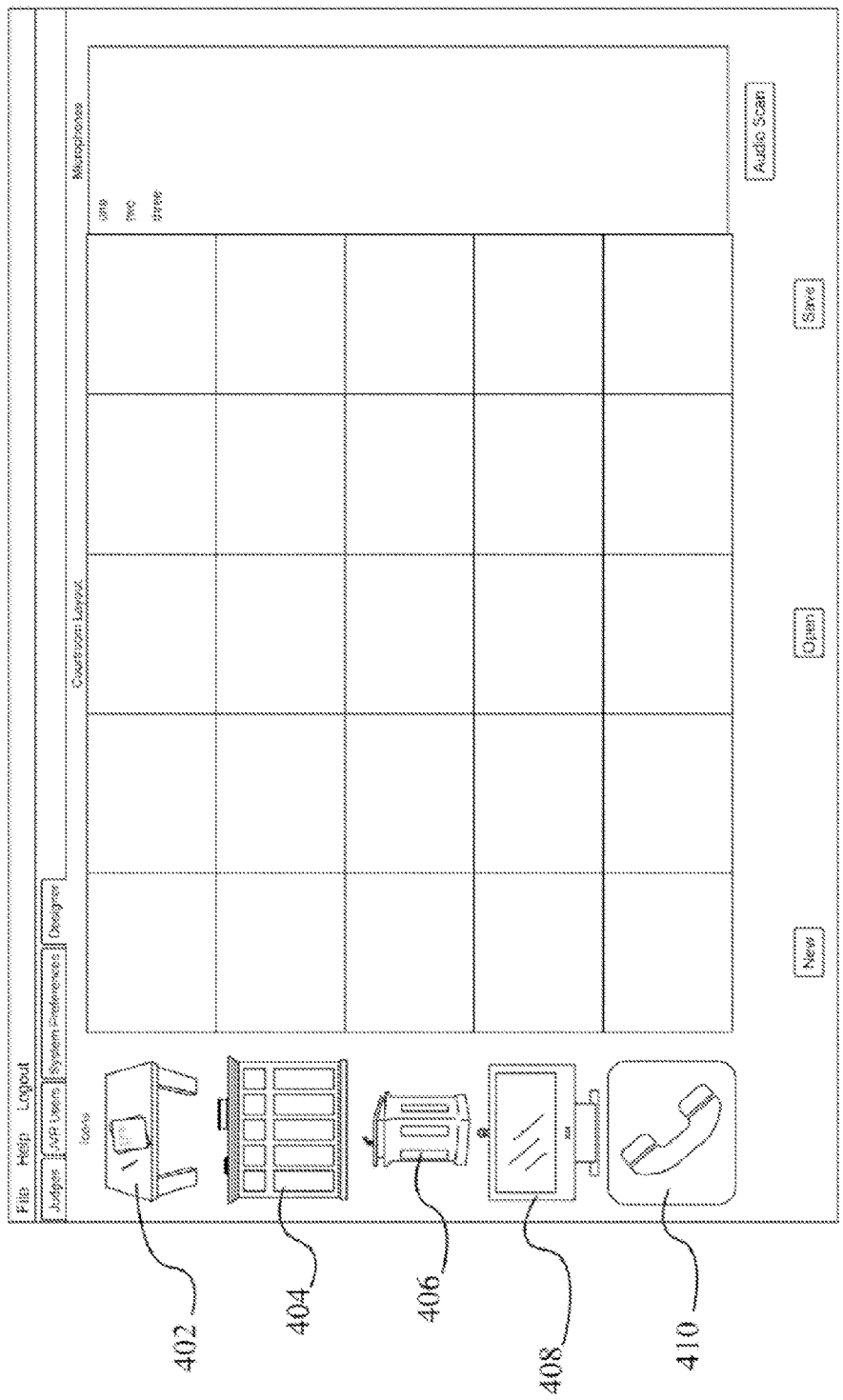
FIG. 4 is a screen shot of a venue mapping feature according to at least one example.

In operation, an operator or user can generate a mapping of the venue. For example, the audio/video recorder 300 can display a map template for a generic venue space on the user interface 306 (e.g., a display) where a user can indicate a relative location for each audio source within the venue. For example, the processing circuit 302 may include logic (e.g., the venue mapping circuit 313 and/or the venue mapping operations 320) to receive user inputs via the user interface 306 (e.g., a mouse, a keyboard, a touchscreen) for selecting relative positions for each audio source in the venue. Turning to FIG. 4, an exemplary screen view is shown illustrating venue mapping according to at least one example. The depicted image is an example of a graphical user interface that may be displayed via the user interface 306 to an operator for mapping the venue. In some examples, the processing circuit 302 may include logic (e.g., the venue mapping circuit 313 and/or the venue mapping operations 320) to identify the number of audio/video sources connected to the audio/video interface 304, and may generate a list for the user. The user can then select an icon to represent each audio/video source. As shown, icons may include a table 402, a stand 404, a lectern 406, a television 408, and a telephone 410, as well as other icons. The user can then position each icon into a location within the grid to the right of the various icons in FIG. 4. In some examples, the user may drag and drop an icon into a location in the grid. Other operations may also be used to position the icons in the grid to illustrate general locations of the different audio sources within the venue.

Figures 5, 6:
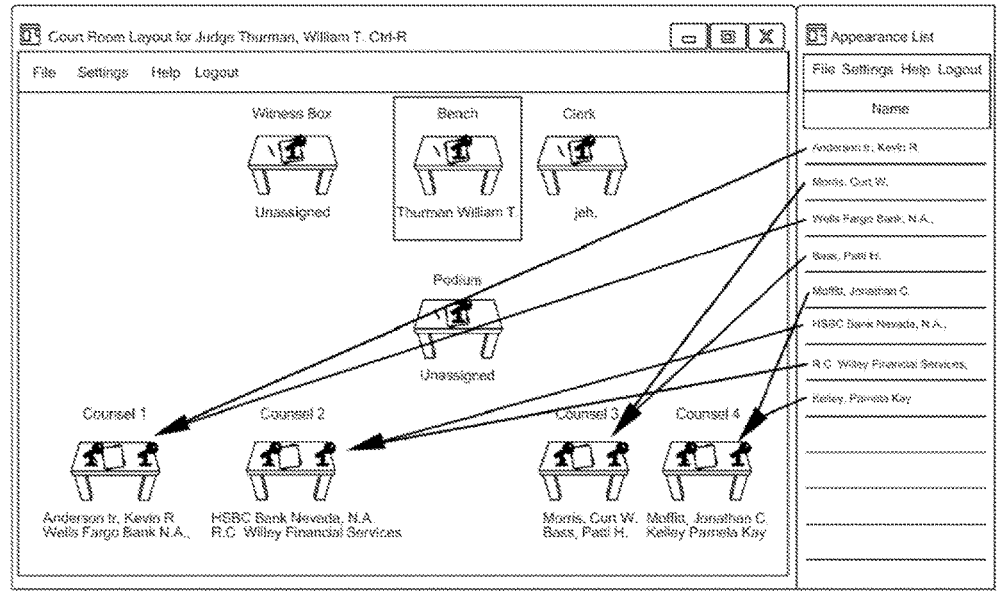
FIG. 5 is a screen shot of a mapped venue displayed to an operator according to at least one embodiment.
FIG. 6 is an example of a time line that may be generated and displayed according to at least one implementation.

With the venue mapped to show relative locations for each audio/video source, the audio/video recorder 300 can assign a name for each individual who will be speaking at each respective audio source. For example, FIG. 5 is a screen shot of a mapped venue displayed by the user interface 306 according to at least one embodiment. In this example, the venue has been mapped as depicted in the left-side window. On the right side is a list of parties and/or persons in attendance for the proceedings. In some embodiments, a user can manually input a name for each party or person who will be participating in the proceedings. In other embodiments, the processing circuit 302 includes logic (e.g., case management integration circuit and/or case management integration operations) for obtaining case information from a case management database and/or calendar system. In general, a case management database may include any database accessible by the processing circuit 302 and including case information. Such a case management database may be accessible using an extensible, object-oriented data factory. Such a data factory may support multiple data formats, such as databases (e.g., Oracle, Informix, MySQL, Postgres, etc.), structured text (e.g., spreadsheets, CSV, XML, etc.), and third-party API's. At least one example of a case management database may include U.S. Court Case Management System CM/ECF employed in United States Federal Courts.

In embodiments where case information is obtained from a case management database and/or calendar system, the processing circuit 302 may include logic (e.g., case management integration circuit and/or case management integration operations) to receive an input from a user, where the input identifies a specific case or matter. The processing circuit 302 may then access a case management database and employ the received case or matter identifier to obtain case information associated with the input case or matter identifier. In other examples, the processing circuit 302 may include logic (e.g., case management integration circuit and/or case management integration operations) to obtain a case or matter identifier from a calendar system for a current date and time. For instance, the processing circuit 302 may access the calendar system to detect a case identifier scheduled for the current date and time. The processing circuit 302 may then obtain case information associated with the scheduled case or matter identifier from the case management database. Some examples of case information that may be obtained from the case management database may include the name of the judge, the names of the parties involved, the names of the attorney of record, the roles of each party and/or attorney of record, the purpose for the proceedings, etc.

With at least the names of the various persons who will participate in the proceedings input into or obtained by the audio/video recorder 300, the user can associate each input name with an audio source in the mapped venue as illustrated by the arrows in FIG. 5. For example, one or more persons can be associated with each of the counsel tables 1, 2, 3, and 4 in FIG. 5. In some examples, this association may be completed by drag-and-drop functionality. For example, the processing circuit 302 may include logic (e.g., the venue mapping circuit 313 and/or the venue mapping operations 320) to detect an input by a user (e.g., depressing a mouse button) selecting a name from the appearance list on a display and moving the selected name on the display to an audio source location within the displayed venue map. The processing circuit 302 may then detect a deselection (e.g., release of a mouse button) when the name is positioned on the display by the user over the desired audio source in the venue map, and the processing circuit 302 can then identify the selected name with the selected audio source for the proceedings. In this manner, the processing circuit 302 logic (e.g., the venue mapping circuit 313 and/or the venue mapping operations 320) can associate the identity of a speaker with an audio channel input 314 at the audio/video interface 304.

In other examples, the association of names with audio sources can be mapped automatically. For instance, the obtained case information may identify the role of each attorney of record or of each party. The processing circuit 302 may accordingly include logic (e.g., the venue mapping circuit 313 and/or the venue mapping operations 320) to assign a name associated with each role to an audio source associated with that role. By way of example, a party and/or attorney of record may be identified as being a plaintiff for a particular hearing, and the processing circuit 302 may include logic (e.g., the venue mapping circuit 313 and/or the venue mapping operations 320) to associate the name of the party and/or attorney of record with an audio source associated with the plaintiff, such as the plaintiff's counsel table 108 in FIG. 1. The processing circuit 302 may further include logic (e.g., the venue mapping circuit 313 and/or the venue mapping operations 320) to enable a user to override any such automatic assignments if the actual mapping differs from what was automatically mapped.

With the venue mapped and the speakers associated with a respective audio source, the audio/video recorder 300 can begin recording the proceedings. When an operator initiates recording, the audio/video recorder 300 can receive audio signals at an audio channel input 314 of the audio/video interface 304. The processing circuit 302 generally stores those audio signals in the storage medium 308 as an independent audio track.

According to an aspect of the disclosure, the audio/video recorder 300 can be configured to automatically track speakers as they participate in the recorded proceedings and creates an accurate timeline of speakers on their assigned audio channels. Additionally, the audio/video recorder 300 can generate and correlate metadata with the recording that can be integrated with a case management and/or a calendar system. By way of example, the processing circuit 302 may include logic (e.g., the speaker tracking circuit 312 and/or the speaker tracking operations 318) to determine when a person is speaking, and generate a timeline indicating which speaker is speaking. The timeline can include a timestamp correlated with the recording to indicate when a person is speaking. In at least one implementation, the processing circuit 302 can include logic (e.g., the speaker tracking circuit 312 and/or the speaker tracking operations 318) to detect when an amplitude of a received audio signal at an audio channel is above a predetermined threshold. This detection can indicate to the processing circuit 302 that the speaker associated with the respective audio channel input 314 at the audio/video interface 304 has begun speaking. The processing circuit 302 can include logic (e.g., the speaker tracking circuit 312 and/or the speaker tracking operations 318) to determine a time when the amplitude was detected above the threshold and to generate metadata that indicates that the speaker began speaking at the determined time.

Referring now to FIG. 6, an example of a time line is shown according to at least one implementation. As described above with reference to FIG. 5, various identities were associated with the different audio sources in the depicted courtroom. At shown at FIG. 6, when an amplitude of an audio source mapped to counsel table 1 is above the predefined threshold, the logic included in the processing circuit 302 (e.g., the speaker tracking circuit 312 and/or the speaker tracking operations 318) detects that the identity associated with counsel table 1, Patti H. Bass, has begun speaking at time 2014 Jul. 10 13:29:07. At 2014 Jul. 10 13:29:08, William T. Thurman was detected as beginning to speak from the bench, and the timeline continues as illustrated. In this manner, the processing circuit 302 logic (e.g., the speaker tracking circuit 312 and/or the speaker tracking operations 318) can generate metadata to indicate that an identity of a speaker began speaking at each determined time.

As shown, the time difference between Patti and William is only one second. In some instances, this may indicate that the two speakers were speaking at the same time. Typically, when two or more speakers are speaking over each other, it is difficult to understand what each person is saying. As has been noted above, the audio/video recorder 300 of the present disclosure is configured to store each audio channel is stored as a separate audio track. As a result, each audio track can be played back in isolation, to enable to speech from each speaker to be heard and understood without the interruption from the other simultaneous speaker.

The metadata generated by the processing circuit 302 logic (e.g., the speaker tracking circuit 312 and/or the speaker tracking operations 318) as the speaker timeline depicted in FIG. 6 can be stored in the storage medium 308 with the stored audio signals to create a single proceeding record. Additional metadata and video may also be correlated, synchronized, and stored with the audio signals based upon an elapsed recording time measurement. As a result, playback from the stored data can offer the correlated data for synchronized review during a multimedia playback. The number of sources for metadata may be unlimited. Some examples of metadata may include the venue map, audio source assignment (e.g., name or other identity of speaker assigned to an audio source), the proceeding date and time, recording notes input manually by an operator, the speaker timeline, etc.

In some instances, a speaker may wish to have certain conversations private and not part of the record. In some implementations, a party may have the option to mute their microphone or have the user of the audio/video recorder 300 mute their associated input for a period of time while private conversations occur. Additionally, a judge or magistrate may be able to record sidebars or to mute their microphone for private conversations.

Figure 7:
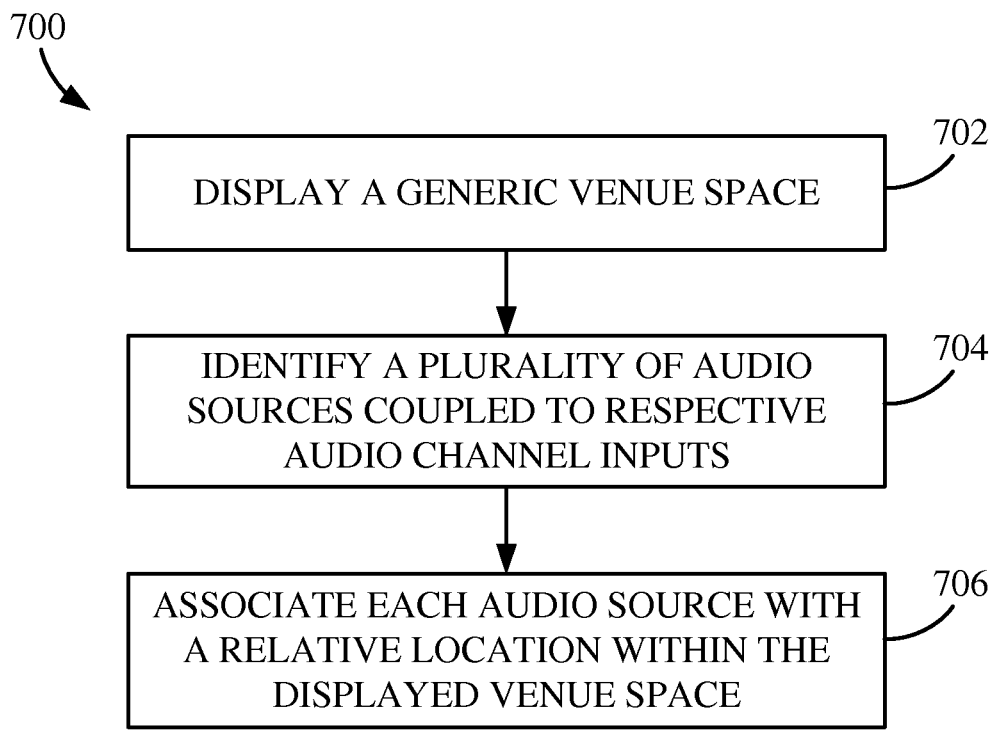
FIG. 7 is a flow diagram illustrating at least one implementation of a method operational on an audio/video recorder for mapping a relative location for a plurality of audio sources within a venue.

Additional aspects of the present disclosure relate to methods operational on an audio/video recorder, such as the audio/video recorder 300. FIG. 7 is a flow diagram illustrating at least one implementation of a method 700 operational on an audio/video recorder for mapping a relative location for a plurality of audio sources within a venue. Referring to FIG. 7 and FIG. 3, an audio/video recorder 300 may display a generic venue space to an operator at box 702. For example, the processing circuit 302 may include logic (e.g., the venue mapping circuit 313 and/or the venue mapping operations 320) to display a generic venue space on a user interface 306 (e.g., a display) visible to an operator. An example of a generic venue space is depicted in FIG. 4

At box 704, the audio/video recorder 300 may identify a plurality of audio sources coupled to respective audio channel inputs 314. For example, the processing circuit 302 may include logic (e.g., the venue mapping circuit 313 and/or the venue mapping operations 320) to identify each of the audio sources connected to an audio channel 314 of the audio/video interface 304. The processing circuit 302 can further include logic (e.g., the venue mapping circuit 313 and/or the venue mapping operations 320) to generate a list of each of the identified audio sources. In other implementations, the user may manually input each of the audio sources into a list of audio sources via the user interface 306 (e.g., a keyboard).

At box 706, the audio/video recorder 300 can associate each audio source with a relative location within the displayed venue space. For example, the processing circuit 302 may include logic (e.g., the venue mapping circuit 313 and/or the venue mapping operations 320) to receive inputs from an operator locating each of the audio sources into positions relative to each other within the displayed venue space. In at least one example, the logic of the processing circuit 302 (e.g., the venue mapping circuit 313 and/or the venue mapping operations 320) may receive the inputs from the operator by drag-and-drop techniques. That is, the user may be able to drag a respective icon representing each audio source and drop the icon into a location in the displayed venue space.

Once the locations of audio sources for a venue have been determined, the configuration of the venue may be saved and recalled as needed. Hence, if a judge likes the courtroom to have a particular physical configuration for a trial and a different configuration for a hearing on a motion or for criminal sentencing, each differing configuration may be saved and recalled as needed. Further, it is common for more than one judge to share some courtrooms. The courtroom configurations for each judge may be saved and recalled as needed, so that the courtroom administrator may arrange the furniture and audio and/or video sources physically within the courtroom according to the configuration selected from the system.

Figure 8:
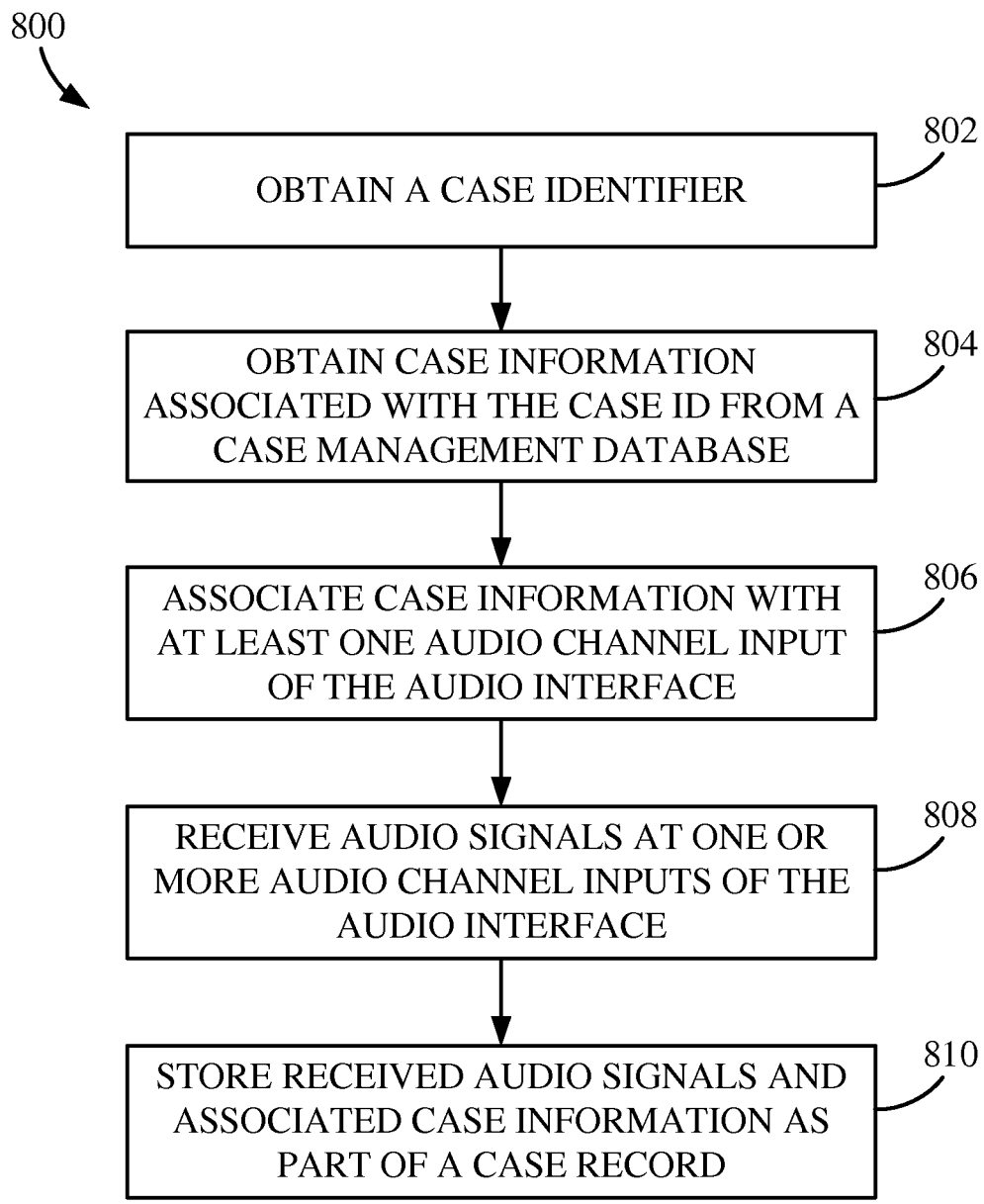
FIG. 8 is a flow diagram illustrating at least one implementation of a method operational on an audio/video recorder for integrating case information from a case management database to generate a case record with recorded audio combined with metadata.

Turning now to FIG. 8, a flow diagram is disclosed illustrating at least one implementation of a method 800 operational on an audio/video recorder for integrating case information from a case management database to generate a case record with recorded audio combined with metadata. Referring to FIG. 3 and FIG. 8, an audio/video recorder 300 may obtain a case identifier at box 802. For example, the processing circuit 302 may include logic (e.g., the case management integration circuit 310 and/or the case management integration operations 316) to obtain a case identifier. In at least one example, the processing circuit 302 may include logic (e.g., the case management integration circuit 310 and/or the case management integration operations 316) to receive an input from an operator via the user interface 306, where the received input includes the case identifier.

In another example, the processing circuit 302 may include logic (e.g., the case management integration circuit 310 and/or the case management integration operations 316) to obtain the case identifier from a calendar system. For instance, the processing circuit 302 may include logic (e.g., the case management integration circuit 310 and/or the case management integration operations 316) to access the calendar system and detect a case identifier associated with the current date and time. That is, the calendar system may have one or more cases scheduled for a particular day, and the processing circuit 302 logic (e.g., the case management integration circuit 310 and/or the case management integration operations 316) may be adapted to obtain the daily schedule from the calendar system and detect which case identifier is scheduled for the current time.

At box 804, the audio/video recorder 300 can obtain case information associated with the case identifier from a case management database. For example, the processing circuit 302 may include logic (e.g., the case management integration circuit 310 and/or the case management integration operations 316) to access a case management database and retrieve data associated with the case identifier. As noted above, the case management database may include a database accessible by the processing circuit 302 and including case information. Such a case management database may be accessible using an extensible, object-oriented data factory. Such a data factory may support multiple data formats, such as databases (e.g., Oracle, Informix, MySQL, Postgres, etc.), structured text (e.g., spreadsheets, CSV, XML, etc.), and third-party API's. At least one example of a case management database may include US Court Case Management System CM/ECF employed in United States Federal Courts. The case information obtained from the case management database may include information such as names of involved parties, names for each attorney of record, the roles of each party and/or attorney of record, description of the scheduled proceeding (e.g., hearing, trial, motions, etc.), the time of the proceeding, notes added to previous proceedings for the case, and/or identities of parties involved in previous proceedings for the case.

At box 806, the audio/video recorder 300 associates at least some of the case information with one or more audio channel inputs 314 of the audio/video interface 304. For example, the processing circuit 302 may include logic (e.g., the venue mapping circuit 313 and/or the venue mapping operations 320) to associate at least some of the obtained case information with one or more audio channel inputs 314. As an example, the logic of the processing circuit 302 (e.g., the venue mapping circuit 313 and/or the venue mapping operations 320) can facilitate the association of an identity of a speaker with an audio channel input 314 at the audio/video interface 304, such that any audio signals received at the associated audio channel input 314 can be identified as originating from the named speaker or party, as described above.

At box 808, the audio/video recorder 300 receives audio signals at one or more audio channel inputs 314 of the audio interface 304. At box 810, the audio/video recorder 300 can store the received audio signals and the associated case information as at least a portion of a case record for the proceeding. For example, the processing circuit 302 may be adapted to receive audio signals via one or more audio channel inputs 314 of the audio interface 304, and then store those audio signals in the storage medium 308 together with the case information associated with each of the one or more audio channel inputs 314. The stored audio data and case information can form a portion of a case record relating to the associated case identifier.

Figure 9:
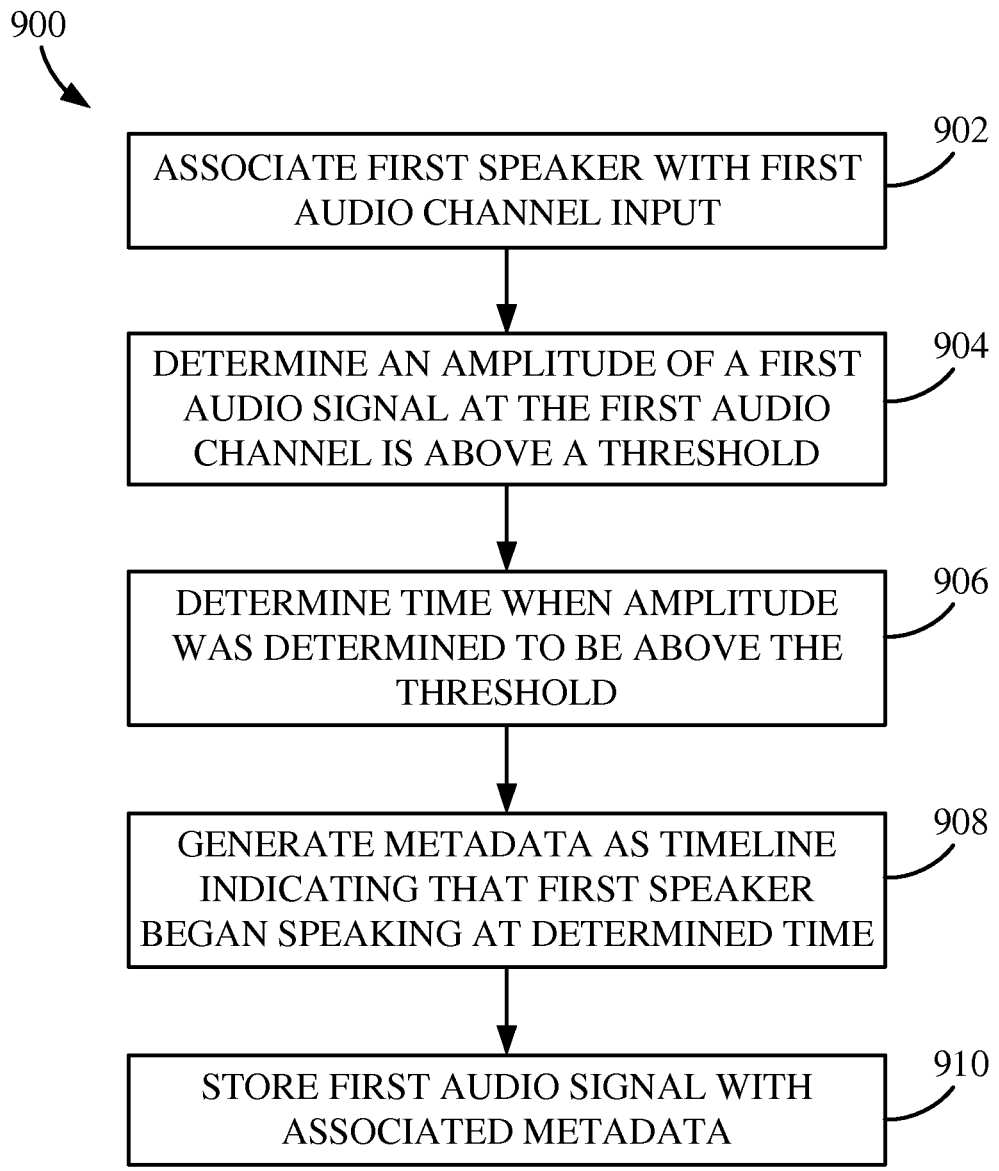
FIG. 9 is a flow diagram illustrating at least one implementation of a method operational on an audio/video recorder for automatically tracking speakers and creating a speaker timeline.

Turning now to FIG. 9, a flow diagram is disclosed illustrating at least one implementation of a method 900 operational on an audio/video recorder for automatically tracking speakers and creating a speaker timeline. Referring to FIG. 3 and FIG. 9, an audio/video recorder 300 can associate a first speaker with a first audio channel input 314 of the audio interface 304 at box 902. For example, the processing circuit 302 may include logic (e.g., the venue mapping circuit 313 and/or the venue mapping operations 320) to associate an identity of a speaker with a first audio channel input 314 of the audio interface 304. In this way, the processing circuit 302 can identify any audio signals received at the first audio channel input 314 as originating from the first speaker, as identified.

At 904, the audio/video recorder 300 can determine whether an amplitude of an audio signal received at the first audio channel 314 input is above a threshold. For example, the processing circuit 302 may include logic (e.g., the speaker tracking circuit 312 and/or the speaker tracking operations 318) to detect an amplitude for any audio signals received on each audio channel input 314. In one implementation, the logic of the processing circuit 302 (e.g., the speaker tracking circuit 312 and/or the speaker tracking operations 318) may monitor the amplitude of each audio channel input 314. When the amplitude of a received audio signal is above a threshold, the logic of the processing circuit 302 (e.g., the speaker tracking circuit 312 and/or the speaker tracking operations 318) may be configured to determine that a person is speaking at the audio source associated with the audio channel input 314.

At box 906, the audio/video recorder 300 determines a time when the amplitude of the received audio signal in the first audio channel input 314 was determined to be above the threshold. For example, the processing circuit 302 may include logic (e.g., the speaker tracking circuit 312 and/or the speaker tracking operations 318) to keep a timer and to apply a timestamp to an audio channel input 314 when the amplitude of a received audio signal is above the threshold.

At box 908, the audio/video recorder 300 can generate metadata as a timeline indicating that the first speaker began speaking at the determined time. For example, the processing circuit 302 may include logic (e.g., the speaker tracking circuit 312 and/or the speaker tracking operations 318) to generate metadata as a timeline, such as the timeline described above with reference to FIG. 6, indicating that the first speaker started speaking at the determined time.

Each time another person speaks, the audio/video recorder 300 can continue to detect when the person speaks and add to the timeline metadata to track the speakers during a proceeding. The generated metadata associated with the received audio signals can all be stored together at box 910. For example, the audio signals received at the audio channel inputs 314 can be stored in the storage medium 308 together with the generated metadata that has been associated with and correlated to the received audio signals. The combined and stored audio tracks and metadata can make up a single case record for the proceeding.

In some implementations, the audio/video recorder 300 may record continuously for a period of time during which proceedings for more than one case occur. In such an implementation, a user input may cause a start tag and an end tag to be inserted in the metadata to separate each case in the continuous recording. For example, the processing circuit 302 may include logic to receive a user input indicating a beginning of a proceeding related to a particular case identifier, and to associate a start tag as metadata indicating a time when a proceeding related to the case identifier was initiated. The start tag represents metadata that can separate one case proceeding from a previous case proceeding when the audio is recorded continuously between two or more proceedings for different cases. Additionally, the processing circuit 302 may include logic to receive a user input indicating an end of a proceeding related to a particular case identifier, and to associate an end tag as metadata indicating a time when the proceeding related to a particular case identifier has ended. The end tag represents metadata that can separate one case proceeding from a subsequent case proceeding when the audio is recorded continuously between two or more proceedings for different cases.

As a result of one or more aspects of the present disclosure, audio/video recorders can obtain audio and/or video recordings of a proceeding, where such recordings includes various forms of metadata, such as graphical representation of the venue, audio source assignments, date and time of the proceeding, case data, recording notes, and speaker timelines. The metadata is correlated with the timeline of the audio recording to provide additional information to a person who later reviews the audio and/or video record.

One or more of the components, steps, features and/or functions illustrated in FIGS. 1, 2, 3, 4, 5, 6, 7, 8, and/or 9 may be rearranged and/or combined into a single component, step, feature or function or embodied in several components, steps, or functions. Additional elements, components, steps, and/or functions may also be added without departing from the disclosure. The apparatus, devices, and/or components illustrated in FIGS. 2 and/or 3 may be configured to include one or more of the features or to perform one or more of the methods, features, or steps described with reference to FIGS. 4, 5, 6, 7, 8, and/or 9. The novel algorithms described herein may also be efficiently implemented in software, firmware and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, examples may be implemented by hardware, software, firmware, middleware, microcode, or any combination thereof. When implemented in software, firmware, middleware or microcode, the program code or code segments to perform the necessary tasks may be stored in a machine-readable medium such as a non-transitory storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Those of skill in the art would further appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Furthermore, programming adapted to perform one or more of the various steps or processes described creates a new machine, because a general purpose computer in effect becomes a special purpose computer once it is programmed to perform particular functions pursuant to instructions from program software.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. An audio/video recorder for recording an accurate case record, comprising:
   an audio interface including a plurality of audio channel inputs, each audio channel input of the plurality of audio channel inputs being separate from each other audio channel input;
   a storage medium;
   a display adapted to visually represent graphical data; and
   a processing circuit coupled to the audio interface, the storage medium, and the display, the processing circuit comprising logic to:
      obtain a case identifier;
      obtain case information associated with the case identifier from a case management database, the case management database being separate from the storage medium;

associate at least some of the case information with one or more audio channel inputs of the audio interface;
receive audio signals continuously at each of the one or more audio channel inputs of the audio interface; and
store contemporaneously in the storage medium the continuously received audio signals, the audio signals of each audio channel input being stored accurately and independently of the audio signals of each other audio channel input, the continuously received audio signals and the associated case information comprise at least a portion of the accurate case record,
wherein the processing circuit further comprises logic to:
show a venue space on the display; and
receive user inputs to associate one or more of the audio channel inputs with a relative location in the venue space.

2. The audio/video recorder of claim 1, wherein the case information includes at least on of a respective name for each involved party, a respective name for each attorney of record, or a description of a scheduled proceeding.

3. The audio/video recorder of claim 1, wherein the logic to obtain the case identifier comprises logic to receive the case identifier from inputs by a user.

4. The audio/video recorder of claim 1, wherein the logic to obtain the case identifier comprises logic to:
access a calendar system; and
detect the case identifier associated with a current date and time.

5. The audio/video recorder of claim 1, wherein the processing circuit further comprises logic to:
detect an amplitude of an audio signal continuously received at a first audio channel input to be above a threshold;
determine a time when the amplitude of the continuously received audio signal was detected to be above the threshold;
generate metadata as a timeline indicating that an identity of a speaker obtained from the case information and associated with the first audio channel input began speaking at the determined time; and
store in the storage medium the metadata as part of the accurate case record.

6. The audio/video recorder of claim 1, wherein the processing circuit further comprises logic to:
receive a first user input indicating a beginning of a proceeding related to the case identifier;
associate a start tag as metadata indicating a time when a proceeding related to the case identifier was initiated, wherein the start tag separates the proceeding from a previous proceeding in a continuous recording;
receive a second user input indicating an end of the proceeding; and
associate an end tag as metadata indicating a time when the proceeding related to the case identifier ended, wherein the end tag separates the proceeding from a subsequent proceeding in the continuous recording.

7. A method operational on an audio/video recorder for recording an accurate case record, comprising:
obtaining a case identifier;
obtaining case information associated with the case identifier from a case management database;
associating at least some of the case information with one or more audio channel inputs of an audio interface, each audio channel input being maintained separate from each other audio channel input;
receiving audio signals continuously at each of the one or more audio channel inputs of the audio interface;
storing the audio signals of each audio channel input in a storage medium accurately and independently of the audio signals of each other audio channel input;
storing contemporaneously the continuously received audio signals and the associated case information for each separate audio channel input in the storage medium separate from the case management database as at least a portion of the accurate case record;
displaying a venue space on a display; and
receiving user inputs to associate one or more audio channel inputs with a relative location in the venue space.

8. The method of claim 7, wherein obtaining the case information comprises obtaining at least one of a respective name for each involved party, a respective name for each attorney of record, or a description of a scheduled proceeding.

9. The method of claim 7, wherein obtaining the case identifier comprises receiving an input from a user including the case identifier.

10. The method of claim 7, wherein obtaining the case identifier comprises:
accessing a calendar system; and
detecting the case identifier scheduled in the calendar system for a current date and time.

11. The method of claim 7, further comprising:
detecting an amplitude of an audio signal continuously received at a first audio channel input to be above a threshold;
determining a time when the amplitude of the continuously received audio signal was detected to be above the threshold;
generating metadata as a timeline indicating that an identity of a speaker obtained from the case information and associated with the first audio channel input began speaking at the determined time; and
storing the metadata with the stored audio signal as part of the accurate case record.

12. The method of claim 8, further comprising:
generating a start tag as metadata in response to a first user input, wherein the start tag indicates a time when a proceeding related to the case identifier was initiated and separates the proceeding from a previous proceeding in a continuous recording; and
generating an end tag as metadata in response to a second user input, wherein the end tag indicates a time when the proceeding related to the case identifier ended and separates the proceeding from a subsequent proceeding in the continuous recording.

13. An audio/video recorder for recording an accurate case record, comprising:
an audio interface including a plurality of audio channel inputs, each audio channel input of the plurality of audio channel inputs being received continuously and separate from each other audio channel input, each audio channel input continuously receives an audio signal to be stored as at least a portion of an audio track;
a storage medium;
a display adapted to visually represent graphical data;
a processing circuit coupled to the audio interface, the storage medium, and the display, the processing circuit comprising logic to:
associate a first speaker with a first audio channel input of the audio interface; determine that an amplitude of a first audio signal continuously received at the first audio channel input is above a threshold;

determine a first time when the amplitude of the first audio signal at the first audio channel was determined to be above the threshold;

generate first metadata as a timeline indicating that the first speaker began speaking at the first time;

store contemporaneously the continuously received first audio signal in the storage medium accurately and independently of the audio signal of each other audio channel input as a first audio track together with the first metadata associated with the first audio track, the first audio track being at least a portion of the accurate case record;

associate a second speaker with a second audio channel input of the audio interface;

determine that an amplitude of a second audio signal continuously received at the second audio channel input is above a threshold;

determine a second time, subsequent to the first time, when the amplitude of the second audio signal at the second audio channel was determined to be above the threshold;

generate second metadata to indicate that the second speaker began speaking at the second time; and store contemporaneously the continuously received second audio signal in the storage medium accurately and independently as a second audio track together with the second metadata indicating that the second speaker began speaking at the determined time, storage of the second audio track and second metadata being separate from the first audio track and the first metadata;

wherein the stored first audio track, second audio track, first metadata, and second metadata comprises at least a portion of the single, accurate case record.

14. The audio/video recorder of claim 13, wherein the processing circuit further comprises logic to:

obtain the identity of the first speaker from a case management database prior to associating the identity of the first speaker with the first audio channel input of the audio interface, the storage medium being separate from the case management database.

15. The audio/video recorder of claim 14, wherein the logic to obtain the identity of the first speaker from a case management database comprises logic to obtain case information including the identity of the first speaker from the case management database based on a case identifier input by a user.

16. The audio/video recorder of claim 14, wherein the logic to obtain the identity of the first speaker from a case management database comprises logic to:

access a calendar system;

detect a case identifier associated with a current date and time; and obtain case information including the identity of the first speaker from the case management database based on the detected case identifier.

17. The audio/video recorder of claim 13, wherein the processing circuit further comprises logic to:

display a venue space on the display; and receive user inputs to associate one or more of the audio channel inputs with a relative location in the venue space.

18. A method operational on an audio/video recorder for recording an accurate case record, comprising:

associating a first speaker with a first audio channel input of an audio interface, each audio channel input of the plurality of audio channel inputs being received continuously and separate from each other audio channel input, each audio channel input continuously receives an audio signal to be stored as at least a portion of an audio track;

determining that an amplitude of a first audio signal continuously received at the first audio channel input is above a threshold;

determining a first time when the amplitude of the first audio signal at the first audio channel was determined to be above the threshold;

generating first metadata as a timeline indicating that the first speaker began speaking at the first time; and storing contemporaneously the continuously received first audio signal accurately and independently of the audio signal of each other audio channel input as a first audio track together with the first metadata associated with the first audio track, the first audio track being at least a portion of the accurate case record;

associating a second speaker with a second audio channel input of the audio interface;

determining that an amplitude of a second audio signal continuously received at the second audio channel input is above a threshold;

determining a second time, subsequent to the first time, when the amplitude of the second audio signal at the second audio channel was determined to be above the threshold;

generating second metadata to indicate that the second speaker began speaking at the second time; and storing contemporaneously the continuously received second audio signal in the storage medium accurately and independently as a second audio track together with the second metadata indicating that the second speaker began speaking at the determined time, the storage of the second audio track and second metadata being separate from the first audio track and the first metadata;

wherein the stored first audio track, second audio track, first metadata, and second metadata comprises at least a portion of the single, accurate case record.

19. The method of claim 18, further comprising:

obtaining the identity of the first speaker from a case management database prior to associating the identity of the first speaker with the first audio channel input of the audio interface, the storage medium being separate from the case management database.

20. The method of claim 19, wherein obtaining the identity of the first speaker from a case management database comprises:

receiving an input from a user including a case identifier; and obtaining the case information from the case management database based on the received case identifier.

21. The method of claim 19, wherein obtaining the identity of the first speaker from a case management database comprises:

accessing a calendar system;

detecting a case identifier scheduled in the calendar system for a current date and time; and obtaining the case information from the case management database based on the detected case identifier.

22. The method of claim 18, further comprising:
displaying a venue space to a user; and
receiving user inputs to associate one or more audio channel inputs with a relative location in the venue space.

\* \* \* \* \*